INVENTOR
AART GERARD VAN NIE.

BY Frank R. Trifari
AGENT

United States Patent Office 3,195,037
Patented July 13, 1965

3,195,037
SIGNAL MEASURING APPARATUS INCLUDING
A VARIABLE RESONANT CIRCUIT
Aart Gerard van Nie, Eindhoven, Netherlands, assignor to
North American Philips Company, Inc., New York,
N.Y., a corporation of Delaware
Filed Mar. 28, 1961, Ser. No. 98,900
Claims priority, application Netherlands, Apr. 6, 1960,
250,241
12 Claims. (Cl. 321—45)

This invention relates to signal measuring devices, and more particularly to signal measuring devices that measure low signals by vibrating means.

One of the types of signal measuring devices of the prior art utilizing vibrating means comprises, inter alia, a vibrating capacitor having a vibratile member means which constitutes a movable electrode disposed in close spatial proximity with a stationary electrode and between which electrodes the signal to be measured is applied. The movable electrode is made to vibrate in response to suitable driving means. This causes the capacitance of the aforementioned electrodes to vary cyclically and, thus causes a high-frequency signal to appear at the output of the vibrating means which is proportional to the signal to be measured. Compatible detection means are utilized to detect the high-frequency signal for correlation of the signal to be measured.

In this known type of aforedescribed devices two kinds of driving means are generally utilized. An alternating electrostatic field in one kind of driving means causes the movable electrode to vibrate by providing, for example, a stationary third electrode placed in close spatial proximity with the movable electrode and applying an alternating signal between them to produce the field. Another kind of driving means utilizes an alternating electromagnetic field to vibrate the movable member. In this last-mentioned kind, an element of the vibratile member means, i.e., the movable electrode, is associated with a magnetic material and placed in an alternating electromagnetic field provided by a winding to which an alternating signal is applied. Generally, the winding is associated with a magnetic core.

In another type of signal measuring device of the prior art utilizing vibrating means, a mechanical interrupter converts the signal to be measured into a proportional alternating signal with the vibratile member means thereof being caused to vibrate, for example, in a manner similar to that described hereinabove.

In some of the devices of the prior art utilizing vibrating means to measure a given signal, the signal of the driving means is modulated. For instance, in one such known device of the aforedescribed type having a vibrating capacitor whose movable electrode is made responsive to an alternating electrostatic field, a series resonance circuit, consisting of an inductor serially connected to a capacitor composed of the movable electrode and the third stationary electrode, is arranged between the control grid and the cathode of an amplifier tube, the anode lead of which contains a circuit, tuned to the high carrier frequency in feedback relationship between its grid and anode circuits. In this manner, the driving is effected by means of a high-frequency current modulated with a low frequency voltage.

However, such aforementioned devices were found to be unsatisfactory because, inter alia, they failed to furnish adequate control of the amplitude of vibration of the vibratile member means. Such control is required, for example, because if the amplitude of vibration becomes so excessive as to exceed the elastic characteristic of the vibratile member means, the mechanical, as well as, the electrical characteristics of such devices may become adversely and/or permanently affected.

It is an object of this invention to provide a signal measuring device utilizing vibrating means having simplified driving means.

Another object of this invention is to control the amplitude of vibration of the vibratile member of the aforementioned signal measuring devices utilizing vibrating means.

Accordingly, this invention features a signal measuring device adapted to measure a given signal from a predetermined source and comprises a vibrating means having a vibratile member means with a predetermined natural frequency of vibration. The vibrating means is associated with suitable input means to which the source of signal to be measured is coupled and is also associated with suitable output means. Provision is made of driving means to drive the vibratile member means and provide an output alternating signal at the output means proportional to the signal to be measured. The driving means comprises a source of alternating signal having a predetermined frequency and an oscillatory circuit having a mean resonant frequency displaced from the source's alternating signal frequency by a predetermined amount. It is preferred that this amount be substantially equal to the natural frequency of the vibratile member. The oscillatory circuit comprises a pair of parallel coupled complementary impedances, one of which controls the vibratile member means and with which the latter is in a responsive coupling relationship. Coupled to the output means are suitable detection means to detect the output alternating signal for correlating the signal to be measured.

In the prior art circuit, the carrier wave frequency is nearly constant and special means must be provided for limiting the amplitude. In the new arrangement the natural frequency of the tuned circuit strongly depends on the position of the movable electrode and the amplitude of the movable electrode is thereby automatically limited.

The above-mentioned and other features and objects of this invention will become more apparent by reference to the following description taken in conjunction with the accompanying drawings, in which.

For the sake of clarity, similar elements are denoted by the same reference numerals in the drawings.

Figure 1:
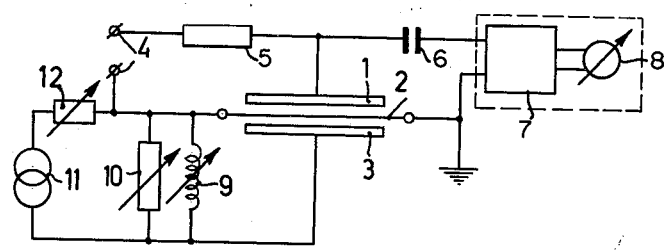
FIG. 1 is a schematic diagram, partly in block form, of the signal measuring device of this invention, and more particularly of an embodiment utilizing a vibrating capacitor and electrostatic driving means.

Referring to FIG. 1, the signal measuring device of this invention is coupled to a source (not shown) of signal to be measured and comprises a vibrating means with a vibratile member means. By way of example only, the vibrating means is illustrated in FIG. 1 as a vibrating capacitor comprising a fixed electrode 1 in close spatial proximity with a movable electrode 2, the latter being the vibratile member means and having a natural frequency P of vibration. The vibrating capacitor may, for example, be of the type in which the movable electrode 2 is a diaphragm or plate suitably supported with or without the aid of clamping and/or tensioning means in a manner well known to those skilled in the art. As will be explained hereinafter, a stationary third electrode 3 is also placed in close spatial proximity with the movable electrode 2 and together they combine to form an impedance with which the vibratile member means is in responsive coupling relationship. The signal to be measured is applied at the terminals 4 to the input of the vibrating means via a resistor 5 of high resistance. The output of the vibrating means is coupled, via capacitor 6, to a suitable signal detection system 7 and which may comprise, for example, compatible amplifier and/or rectifier stages 7 and signal indicator means 8. As is well known to those skilled in the art, when the movable electrode 2 is actuated, the capacitance of electrodes 1, 2 varies and an alternating signal is provided to the input of detection means 7 which is proportional to the signal applied to terminals 4.

To actuate the vibratile member means, a third stationary electrode 3 is provided as mentioned hereinabove. An alternating signal is applied between the electrodes 2 and 3 producing an alternating electrostatic field therebetween which causes movable electrode 2 to vibrate. As will be explained in greater detail hereinafter, the driving means, as illustrated in FIG. 1, comprises an oscillatory circuit having a pair of parallel-coupled complementary impedances, and which has a mean resonant frequency $f_k$. The impedances of the oscillatory circuit of FIG. 1 comprises adjustable inductor 9 and the capacitor formed by electrodes 2 and 3, and may also include parallel connected damping resistor 10. Also included in the driving means is a source 11 of alternating signal, which is preferably a high-frequency oscillator, and resistor 12. Source 11 provides an alternating signal having a frequency $f_0$ which is displaced from the mean resonant frequency $f_k$ of the oscillatory circuit and preferably by an amount substantially equal to the natural frequency P of the vibratile member means.

Figure 2A:
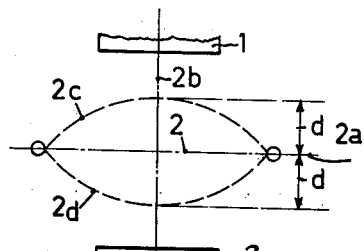
FIG. 2A is an enlarged partial schematic diagram of the electrodes 2, 3 of FIG. 1.

Referring to FIG. 2A the electrode 2 is illustrated as having a normal rest position, indicated by extended dashed line 2a, whenever an electrostatic field which is created by the presence of a signal at the terminals 4, FIG. 1, is absent between electrodes 1 and 2 and the field provided by the driving means, which in FIG. 2A will also be an electrostatic field because of the example of driving means selected in FIG. 1 to teach the principles of this invention, is absent between electrodes 2 and 3. Upon establishment of both fields, as in the case when a signal desired to be measured is applied at terminals 4, the electrode 2 will assume some mean position depending, inter alia, on the relative influence of each of the fields, the distances of electrodes 1 and 3 from 2, etc., which may or may not be identical with its rest position. For the sake of clarity, it will be assumed that the mean position of movable electrode 2 is symmetrical with its rest position 2a. As the field between the electrodes 2–3 is an alternating one, the electrode 2 vibrates about the axis of its mean position in a fundamental mode which causes the entire surface of the electrode 2 to move in phase with a maximum deflection occurring at the center 2b the amplitude d of which is dependent, inter alia, on the strength of the signal of the driving means. It is obvious that the capacitance of electrodes 2 and 3 increases as the electrode 2 moves from a remote position, such as 2c, towards a position, such as 2d, closer to electrode 3. By displacement of the mean resonant frequency $f_k$ of the oscillatory circuit of FIG. 1, which is the resonant frequency of the oscillatory circuit when electrode 2 is in the mean position, from the alternating signal frequency $f_0$ of source 11, the amplitude of vibration is automatically controlled.

Figure 2B:
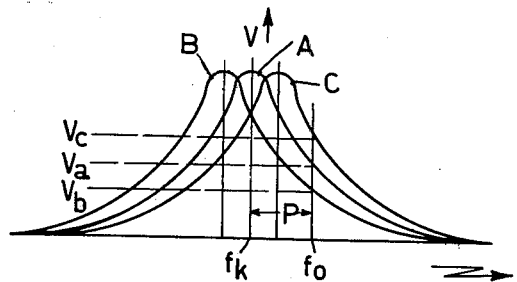
FIG. 2B is a waveform diagram of various frequency response curves of the oscillatory circuit of FIG. 1 helpful in understanding the operation of the device of FIG. 1.

Referring to FIG. 2B, it is seen that the output signal V of the oscillatory circuit automatically limits the vibration amplitude of the electrode 2, as follows. Curve A, FIG. 2B represents the frequency response curve of the oscillatory circuit when the electrode 2 is in the mean position, and is preferably displaced below the alternating signal frequency $f_0$ by a frequency band substantially equal to the natural frequency P of the electrode 2. Curves B and C represent the frequency response curves of the oscillatory circuit of FIG. 1, when the electrode 2 is in positions, such as 2d and 2c, FIG. 2A, respectively. As the capacitance of electrodes 2–3 increases, the resonant frequency of the oscillatory circuit decreases, and vice versa, and there is a corresponding shifting of the frequency response curve of the oscillatory circuit from the frequency response curve of its mean resonant frequency. For example when the alternating signal frequency of source 11 (FIG. 1) is $f_0$ and electrode 2 is moving from the mean position 2a towards a position 2d (FIG. 2A), i.e. towards electrode 3, the oscillatory circuit signal magnitude is decreasing from the value $V_a$ to the value $V_b$ (FIG. 2B). Voltage $V_a$ occurs across the resonant circuit when electrode 2 is in position 2a and the resonant frequency of the circuit is then $f_K$. Voltage $V^b$ appears across the resonant circuit when electrode 2 is in position 2d and the frequency response curve of the circuit is then shown by curve B in FIG. 2B. As a consequence of the reduction in this signal, the electrostatic forces acting between electrodes 2 and 3, and which are proportional to the magnitude of this signal, are also reduced thereby attenuating the advancement and motion of elecrode 2 in the direction towards electrode 3 and automatically limiting the amplitude of the vibratile member means, electrode 2. Conversely, when the electrode 2 moves from its mean position 2a in a direction away from electrode 3, the magnitude of the signal of the oscillatory circuit increases, as illustrated, for example, at $V_c$, curve C, FIG. 2B, which represents the magnitude of the oscillatory circuit signal when the electrode 2 is in a position such as 2c, FIG. 2A. There results a corresponding increase in the electrostatic forces between electrodes 2 and 3 which in turn attenuates the advancement and motion of electrode 2 away from electrode 3 and likewise automatically limits the amplitude of vibration of electrode 2.

Figure 3:
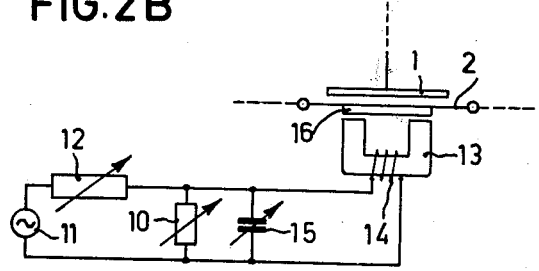
FIG. 3 is a partial schematic diagram of another embodiment of this invention utilzing a vibrating capacitor and electromagnetic driving means.

Referring to FIG. 3, there is illustrated, in part, a signal measuring device according to this invention, which utilizes a vibrating capacitor having a vibratile member means actuated by an alternating electromagnetic field. For the sake of simplicity, some of the parts common to the device illustrated in FIG. 1, viz., parts 4–8, have been omitted, and only the electrodes 1 and 2, and the driving means have been illustrated. The driving means of FIG. 3 comprises a magnetic core 13 and associated winding 14, and parallel connected capacitor 15. Also included is a source 11 of alternating signal and optional resistors 10, 12. The alternating magnetic field is provided by the coaction of the current in winding 14 and core 13. The vibratile member means, movable electrode 2, is actuated by the driving means by providing an element 16 of magnetic material associated with the electrode 2, as, for example, by securing a magnetic slug to the electrode 2. The oscillatory circuit of FIG. 3 comprises the capacitor 15 and a complementary parallel-coupled impedance, to wit, the inductance formed by the winding 14, core 13, and element 16. The electrode 2 is thus in responsive coupling relationship with the inductive impedance so formed and vibrates in a manner similar to the electrode 2 of FIG. 1 as described hereinabove.

As is well known to those skilled in the art, the inductance of winding 14 depends, inter alia, on the relative distance between the core 13 and element 16. In the example of electromagnetic driving means of FIG. 3 chosen to teach the principles of this invention, the inductance of winding 14 is proportional, inter alia, inversely to the length of the air gap between core 13 and element 16, i.e., as the distance between element 16 and core 13 diminishes, the inductance of the oscillatory circuit of FIG. 3 increases. The amplitude of vibration of the vibratile member means, electrode 2, FIG. 3, about its mean position is thereby limited in principle in a manner similar to that described for the electrode 2, FIG. 1 by displacing the frequency $f_o$ of the alternating signal of source 11, FIG. 3 from the mean resonant frequency $f_k$ of the oscillatory circuit 13–16, FIG. 3 by an amount preferably equal to the natural frequency P of vibration of the electrode 2. It is to be understood, however, that the magnetic circuit, comprised of the parts 13, 16 and asociated air gap illustrated in FIG. 3 are by way of example only, and that other configurations may be utilized, as for example, the element 16 may have a cylindrical configuration with an end coupled to the electrode 2 and adapted to move parallel to its longitudinal axis in and out of a driving means' winding having no core, the winding being concentrically aligned with the cylinder shaped element 16. In addition, it is preferred in the example of FIG. 3 for the mean resonant frequency $f_k$ to be displaced above the alternating signal frequency $f_o$. Thus, for example, as the inductance of the oscillatory circuit increases, as when the element 16 moves toward core 13 from its mean position, the resonant frequency decreases from the mean resonant frequency along with a corresponding shift in the frequency response curve. As a result, a signal is produced across the oscillatory circuit which causes a voltage to be induced in the winding 14 that tends to attenuate the movement, i.e. the amplitude of vibration, of element 16 and hence, electrode 2 towards core 13. Similarly, when the electrode 2, via element 16, moves away from its mean position, a signal is produced across the oscillatory circuit which causes a voltage to be induced in winding 14 that tends to attenuate the movement of electrode 2 in this direction.

Figure 4:
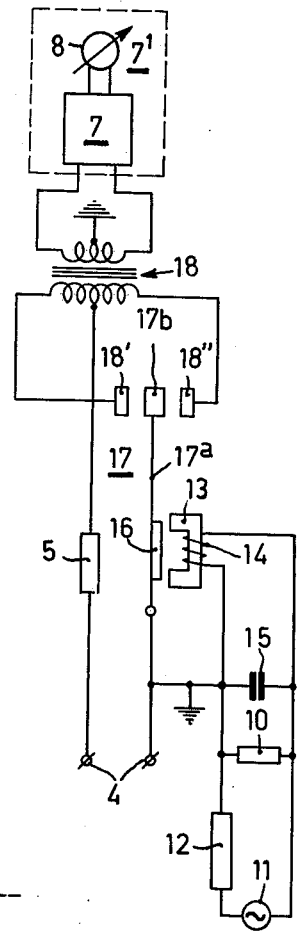
FIG. 4 is still another embodiment of this invention in which a mechanical interrupter is utilized.

Referring to FIG. 4, a signal measuring device utilizing a vibrating means, illustrated as a mechanical interrupter 17, converts a unidirectional signal to be measured to a proportional alternating signal. The particular elements of the mechanical interrupter illustrated in FIG. 4 are again chosen by way of example only, and comprises a vibratile member means, which may be a conductive reed-like member 17a to which is coupled movable contact 17b. Associated with the contact 17b are a pair of main contacts 18', 18" which are connected to the ends of the primary winding of a center tapped transformer 18. Terminals 4 are provided to the input of the vibrating means of FIG. 4, one of which is connected, via resistor 5, to the center tap of the primary of transformer 18. The other terminal is grounded and coupled to movable contact 17b via member 17a. Suitable driving means actuates vibration of the member 17a, and as illustrated in FIG. 4, the vibratile member means, reed-like member 17a, is in responsive coupling relationship with an impedance of the oscillatory circuit of a driving means, illustrated, by way of example only, as being similar to the driving means utilized to actuate the electrode 2 of FIG. 3. Thus, an element 16 of magnetic material is associated with the vibratile member means of FIG. 4.

In operation of the device of FIG. 4, a unilateral signal from a source (not shown) is applied to the terminals 4. The reed-like member 17a is actuated by the driving means of FIG. 4 causing an alternating signal to be present at the output of the secondary winding of transformer 18 proportional to the signal to be measured. The alternating signal is subsequently correlated by detection means 7'.

In principle, the operation of the driving means of FIG. 4 is the same as those of FIGS. 1 and 3 and need not be reiterated. The frequency $f_o$ of the alternating signal generator is displaced from the mean resonant frequency $f_k$ of the oscillatory circuit of FIG. 4, preferably by an amount equal to the natural frequency P of vibration of the reed-like member 17a. It is further preferred, however, for the devices of the type illustrated in FIG. 4 to have the frequency $f_o$ of the alternating signal of source 11, to be substantially equal to the natural frequency P of the vibratile member means, member 17a.

It is to be understood that the configurations of vibrating means and those of the driving means, as well as the combinations thereof, described hereinabove, are intended to be by way of example only and that other modifications and combinations may be utilized by those skilled in the art without departing from the scope of my invention. Thus, while I have described above the principles of my invention in connection with specific apparatus, it is to be clearly understood that this description is made only by way of example and not as a limitation to the scope of my invention as set forth in the objects thereof and in the accompanying claims.

I claim:

1. Electrical apparatus for modifying a characteristic of an electrical signal applied thereto comprising a stationary electrode and a vibratile electrode in capacitive relationship, means for applying said signal to said electrodes, input means for a source of electrical energy at a given frequency, an inductance-capacitance circuit connected to said input means and having a nominal resonant frequency different from that of said energy source, and means for vibrating said vibratile electrode thereby to periodically vary the position thereof relative to said stationary electrode, said vibrating means constituting a component of said inductance-capacitance circuit and undergoing changes in the electrical reactance thereof as determined by the position of said vibratile electrode with respect to said stationary electrode thereby to produce variations of the resonant frequency of said circuit as determined by changes in the position of said vibratile electrode.

2. Electrical apparatus as claimed in claim 1 further comprising an impedance element interposed between said energy source input means and said inductance-capacitance circuit.

3. Electrical apparatus as claimed in claim 1 wherein said vibratile electrode has a mechanically resonant frequency substantially equal to the difference between the frequency of said source and said nominal frequency.

4. Electrical apparatus for modifying a characteristic of an electrical signal applied thereto comprising a stationary electrode and a vibratile electrode in capacitive relationship, means for applying said signal to said electrodes, input means for a source of electrical energy at a given frequency, an inductance-capacitance circuit connected to said input means and having a nominal resonant frequency different from that of said energy source, and means for vibrating said vibratile electrode thereby to periodically vary the position thereof relative to said stationary electrode, said vibrating means comprising a fixed electrode in capacitive relationship to said vibratile electrode, said fixed electrode and said vibratile electrode forming a capacitive component of said inductance-capacitance circuit and undergoing changes in reactance as determined by the position of said vibratile electrode with respect to said stationary electrode thereby to produce variations of the resonant frequency of said circuit as determined by changes in the position of said vibratile electrode.

5. Electrical apparatus for modifying a characteristic of an electrical signal applied thereto comprising a stationary electrode and a vibratile electrode in capacitive relationship, means for applying said signal to said electrodes, input means for a source of electrical energy at a given frequency, an inductance-capacitance circuit connected to said input means and having a nominal resonant frequency different from that of said energy source, and means for vibrating said vibratile electrode thereby to periodically vary the position thereof relative to said stationary electrode, said vibrating means comprising a magneto-inductive element and an armature connected to said vibratile electrode, said magneto-inductive element constituting a component of said inductance-capacitance circuit and undergoing changes in reactance as determined by the position of said armature thereby to produce variations of the resonant frequency of said circuit as determined by changes in the position of said vibratile electrode.

6. Electrical apparatus for modifying a characteristic of an electrical signal applied thereto comprising a stationary electrode and a vibratile electrode in capacitive relationship, means for applying said signal to said electrodes, input means for a source of electrical energy at a given frequency, an inductance-capacitance circuit connected to said input means and having a nominal resonant frequency different from that of said energy source, means for vibrating said vibratile electrode thereby to periodically vary the position thereof relative to said stationary electrode, said vibrating means comprising a fixed electrode in capacitive relationship to said vibratile electrode, said fixed electrode and said vibratile electrode forming a capacitive component of said inductance-capacitance circuit and undergoing changes in reactance as determined by the position of said vibratile electrode with respect to said stationary electrode thereby to produce variations of the resonant frequency of said resonant circuit as determined by changes in the position of said vibratile electrode, and an impedance element interposed between said inductance-capacitance circuit and said input means, said vibratile electrode having a mechanical resonant frequency substantially equal to the difference between the frequency of said source and said nominal frequency.

7. Electrical apparatus for modifying a characteristic of an electrical signal applied thereto comprising a stationary electrode and a vibratile electrode in capacitive relationship, means for applying said signal to said electrodes, input means for a source of electrical energy at a given frequency, an inductance-capacitance circuit connected to said input means and having a nominal resonant frequency different from that of said energy source, means for vibrating said vibratile electrode thereby to periodically vary the position thereof relative to said stationary electrode, said vibrating means comprising a magneto-inductive element and an armature connected to said vibratile electrode, said magneto-inductive element forming a component of said inductance-capacitance circuit and undergoing changes in reactance as determined by the position of said armature thereby to produce variations of the resonant frequency of said resonant circuit as determined by changes in the position of said vibratile electrode, and an impedance element interposed between said input means and said inductance-capacitance circuit, said vibratile electrode and armature having a mechanically resonant frequency substantially equal to the difference between the frequency of said source and said nominal frequency.

8. Electrical converter apparatus for a source of electric signal comprising a vibratory capacitor having a fixed electrode and a movable electrode in capacitive relationship, said movable electrode having a given natural frequency of vibration, means for applying said electric signal to said electrodes, a source of alternating electric energy having a given frequency different from said natural frequency of vibration, a parallel resonant circuit comprising an inductance element and a capacitance element, said circuit having a nominal resonant frequency different from that of said alternating electric energy source, input means for coupling said electric energy source to said resonant circuit, means for vibrating said movable electrode at its said natural frequency thereby to cyclically vary the position thereof relative to said fixed electrode, said vibrating means constituting a reactive component of said resonant circuit which undergoes changes in electrical reactance as determined by the position of said movable electrode relative to said fixed electrode thereby varying the resonant frequency of said circuit according to the position of said movable electrode, and output means coupled to said fixed and movable electrodes.

9. Electrical converter apparatus for a source of electric signal comprising a vibratory capacitor having first and second fixed electrodes and a movable electrode interposed between said fixed electrodes and in capacitive relationship therewith, said movable electrode having a given natural frequency of vibration, means for applying said electric signal to said movable electrode and said first fixed electrode, a source of alternating electric energy having a given frequency different from said natural frequency of vibration, a parallel resonant circuit comprising an inductance element and a capacitance element for deriving a driving signal at said given frequency of said alternating electric energy source thereby to produce vibration of said movable electrode at its said natural frequency thereby to cyclically vary the position thereof relative to said first fixed electrode, said second fixed electrode and said movable electrode forming the capacitance element of said resonant circuit which undergoes changes in reactance as determined by the position of said movable electrode relative to said second fixed electrode thereby varying the resonant frequency of said circuit whereby the amplitude of said driving signal is caused to vary, said resonant circuit having a nominal resonant frequency different from that of said electric energy source, and input means for coupling said electric energy source to said resonant circuit.

10. Apparatus as described in claim 9 further comprising an impedance element serially connected between said input means and said resonant circuit and wherein said movable electrode has a natural mechanical resonant frequency substantially equal to the difference between the frequency of said energy source and said nominal resonant frequency.

11. Electrical converter apparatus for a source of electric signal comprising a vibrating capacitor having a stationary electrode and a movable electrode in capacitive relationship, said movable electrode having predetermined vibration amplitude limits and a given natural frequency of vibration, means for applying said electric signal to said electrodes, a source of alternating electric energy having a given frequency different from said natural frequency of vibration, a parallel resonant circuit comprising an inductance element and a capacitance element for deriving a driving signal at said given frequency of said alternating electric energy source, said resonant circuit having a nominal resonant frequency different from that of said electric energy source, input means for coupling said electric energy source to said resonant circuit, an impedance element interposed in circuit between said input means and said resonant circuit, means for vibrating said movable electrode at its said natural frequency thereby to cyclically vary the position thereof relative to said stationary electrode, said vibrating means comprising a fixed electrode in capacitive relationship to said movable electrode, said driving signal appearing between said movable electrode and said fixed electrode thereby to produce vibration of said movable electrode, said fixed electrode and said movable electrode forming a capacitive component of said resonant circuit which undergoes changes in reactance as determined by the position of said movable electrode relative to said fixed electrode thereby varying the resonant frequency of said circuit whereby the amplitude of said driving signal is caused to vary so as to limit the amplitude of vibration of said movable electrode to said predetermined limits.

12. Apparatus as described in claim 11 wherein the frequency of said energy source is higher than said nominal resonant frequency and wherein said natural resonant frequency of said movable electrode is substantially equal to the difference between the frequency of said energy source and said nominal resonant frequency.

References Cited by the Examiner
UNITED STATES PATENTS

| | | | |
|---|---|---|---|
| 1,906,250 | 5/33 | Devol | 321—45 |
| 2,535,039 | 10/50 | Lindenhovius | 324—118 |
| 2,571,746 | 10/51 | Mouzon | 324—120 |
| 2,632,791 | 3/53 | Side | 317—249 |
| 2,896,164 | 7/59 | Bizouard et al. | 324—125 |

LLOYD McCOLLUM, *Primary Examiner.*

RUDLOPH V. ROLINEC, FREDERICK M. STRADER,
*Examiner.*